(12) United States Patent
Mellinger

(10) Patent No.: US 10,422,455 B1
(45) Date of Patent: Sep. 24, 2019

(54) PIPE ATTACHMENT CLAMP

(71) Applicant: Terminal Manufacturing Co., LLC, Berkely, CA (US)

(72) Inventor: Steven John Mellinger, Berkely, CA (US)

(73) Assignee: TERMINAL MANUFACTURING CO., LLC, Berkely, CA (US)

(*) Notice: Subject to any disclaimer, the term of this patent is extended or adjusted under 35 U.S.C. 154(b) by 462 days.

(21) Appl. No.: 15/092,951

(22) Filed: Apr. 7, 2016

Related U.S. Application Data

(60) Provisional application No. 62/144,456, filed on Apr. 8, 2015.

(51) Int. Cl.
*F16L 23/06* (2006.01)

(52) U.S. Cl.
CPC .................... *F16L 23/06* (2013.01)

(58) Field of Classification Search
CPC .................. F16L 23/06; F16L 23/10
USPC ................. 285/252–253, 365, 407, 420, 87, 285/366–367, 409–411
See application file for complete search history.

(56) References Cited

U.S. PATENT DOCUMENTS

| | | | | | |
|---|---|---|---|---|---|
| 1,646,463 | A * | 10/1927 | Stokesberry | ............ | F16L 23/06 285/409 |
| 2,752,174 | A * | 6/1956 | Frost | ....................... | F16L 23/06 24/270 |
| 3,574,862 | A * | 4/1971 | Jones | ....................... | B63C 11/06 2/2.15 |
| 3,705,737 | A * | 12/1972 | Westerlund | ............. | F16L 23/06 24/271 |
| 4,657,284 | A * | 4/1987 | Fiori | ....................... | F16L 23/10 24/20 S |
| 5,645,303 | A * | 7/1997 | Warehime | ............... | F16L 23/10 24/279 |
| 7,883,121 | B2 * | 2/2011 | Henry | ...................... | F16L 23/10 285/367 |
| 8,220,113 | B2 * | 7/2012 | Morton | ................... | F16L 23/10 24/284 |
| 8,371,623 | B2 * | 2/2013 | Bronnert | ................. | F16L 23/06 285/365 |
| 8,661,626 | B2 * | 3/2014 | Peet | ........................ | F16L 23/10 24/269 |
| 2007/0138351 | A1 * | 6/2007 | Wu | ......................... | F16L 23/06 248/74.2 |

FOREIGN PATENT DOCUMENTS

EP 0726417 A1 * 8/1996 ............. F16L 23/06

* cited by examiner

*Primary Examiner* — Anna M Momper
*Assistant Examiner* — Fannie C Kee
(74) *Attorney, Agent, or Firm* — Edward S. Sherman

(57) ABSTRACT

A flange pipe terminus is attached to a mirror image terminus by a pair of pivoting C-shaped collars. The collars are locked after installation by a lever coupled to one collar that engage a radial abutment at the non-hinged end of the other collar. The lever is terminated with a swinging loop that engages a notch in the abutment. Additional security from accidental opening is provided by a secondary lock that blocks the movement of the loop or lever.

19 Claims, 9 Drawing Sheets

PIPE ATTACHMENT CLAMP

CROSS REFERENCE TO RELATED APPLICATIONS

The present application claims the benefit of priority the US Provisional patent application of same title that was filed on Apr. 8, 2015, having application No. 62/144,546, which is incorporated herein by reference.

BACKGROUND OF INVENTION

The field of invention is clamps for the removable attachment of flanged pipe or closing the end of flanged pipe.

Flange terminated pipes can be removably attached with clamps that secure opposing flanges together under compression by an annular collar. The collar has an inner annular groove to receive the mating pipe flanges.

The compression force can vary with the means used to secure the collar. A typical collar has two opposing C-shaped sections that are joined at one end by a hinge. The other end is secured by a screw attached clamp. The compression will vary with the degree to which the screw is tightened, which would require a torque wrench. In many settings, the screw can be over tightened. The threads can wear over time and generate debris. For flanges that are opened and closed in cyclic production processes, the debris can contaminate the flange surface forming leaks, or contaminate the vessel contents. Screws can come loose over time with repeated use, misuse and vibrations, particularly if the threads are stripped or worn down.

Accordingly, it would be desirable to have such a collar style clamp that avoids the periodic tightening of screw at the clamping ends of the C-shaped members.

It would also be desirable to have such a collar style clamp in which the compression load of the flanges can be set without a torque wrench, in which the compression load is not capable of being tampered with.

It would also be desirable to have such a collar style clamp with multiple safety features, including a tamper proof sealing means.

It would also be desirable to have such a collar style clamp suitable for pressure vessels.

It would also be desirable to have such a clamp that is stamped and certified to meet the rules of the ASME Section VIII, Division 1, which is a much more stringent requirement than being made "in accordance with the ASME code".

It would also be desirable if the clamp mechanism provides a minimum non-adjustable level of clamping force, with minimum particulate generation, which is a critical characteristic for systems where material contamination from such particulate can ruin the product.

The above and other objects, effects, features, and advantages of the present invention will become more apparent from the following description of the embodiments thereof taken in conjunction with the accompanying drawings.

SUMMARY OF INVENTION

In the present invention, the first object is achieved by providing a pipe attachment clamp comprising a pair of collars having an inner annular channel for receiving a pair of opposing flanges of pipes to be coupled, a first hinge coupling a distal end of each collar to the distal end of the other collar, in which the collars are disposed primarily in a first plane, a first adjustable coupling for connecting the proximal end of each collar, the adjustable coupling being formed by a: a first radial abutment from the proximal end of the first of the pair of collars, the radial abutment being shaped to provide a latch receiving means, a second radial abutment from the proximal end of the second of the pair of the collars including; a hinge, an armature having a proximal end and an opposing distal end that is connected to the hinge at the proximal end to rotate in the first plane via the hinge, a lever connected at a proximal end to a distal end of the armature and having a distal end opposing the proximal end, a latch having a proximal end for extending over the first radial abutment and engaging the latch receiving means, wherein the latch is connected in rotary engagement to the lever to secure the first and second radial abutments in a closed position when the distal end of the lever is pivoted toward the second collar to a latched position to secure each collar to the other at the proximal ends thereof.

A second aspect of the invention is characterized by the pipe attachment clamp further comprising a pair of eyelets capable of overlapping in which a first eyelet is disposed on the collar having the hinged lever and the second eyelet is disposed on the lever to overlap with the first eyelet for receiving a locking pin for securing the latched position of the lever.

Another aspect of the invention is characterized by any such pipe attachment clamp further comprising a securing means.

Another aspect of the invention is characterized by any such pipe attachment clamp wherein the securing means is a threaded rod for attaching a nut that is in hinged connection to one of the first and second radial abutments.

Another aspect of the invention is characterized by any such pipe attachment clamp wherein at least one of the collars is substantially a semi-circular body.

Another aspect of the invention is characterized by any such pipe attachment clamp wherein each collar is substantially the mirror image of the other.

Another aspect of the invention is characterized by any such pipe attachment clamp wherein the latch is a rigid wire loop.

Another aspect of the invention is characterized by any such pipe attachment clamp wherein one of the first and second radial abutment at the distal end comprises a pivoting elongated member that extends into a channel in the distal end of the other radial abutment and the elongated member is adapted to be clamped in the channel.

Another aspect of the invention is characterized by any such pipe attachment clamp comprising a locking pin for insertion in the overlapping first eyelet second eyelet.

Another aspect of the invention is characterized by any such pipe attachment clamp wherein the locking pin is attached with a flexible leash to the clamp.

Another aspect of the invention is characterized by any such pipe attachment clamp wherein the locking pin is coupled to a ring for grasping and removal.

Another aspect of the invention is characterized by any such pipe attachment clamp wherein the locking pin is attached with a flexible leash to the clamp at the ring.

Another aspect of the invention is characterized by any such pipe attachment clamp wherein the first hinge comprises a bar having opposing ends, each opposing end in pivoting engagement with the distal end of each of the first and second C-shaped collars.

The above and other objects, effects, features, and advantages of the present invention will become more apparent

DETAILED DESCRIPTION

Figure 1:
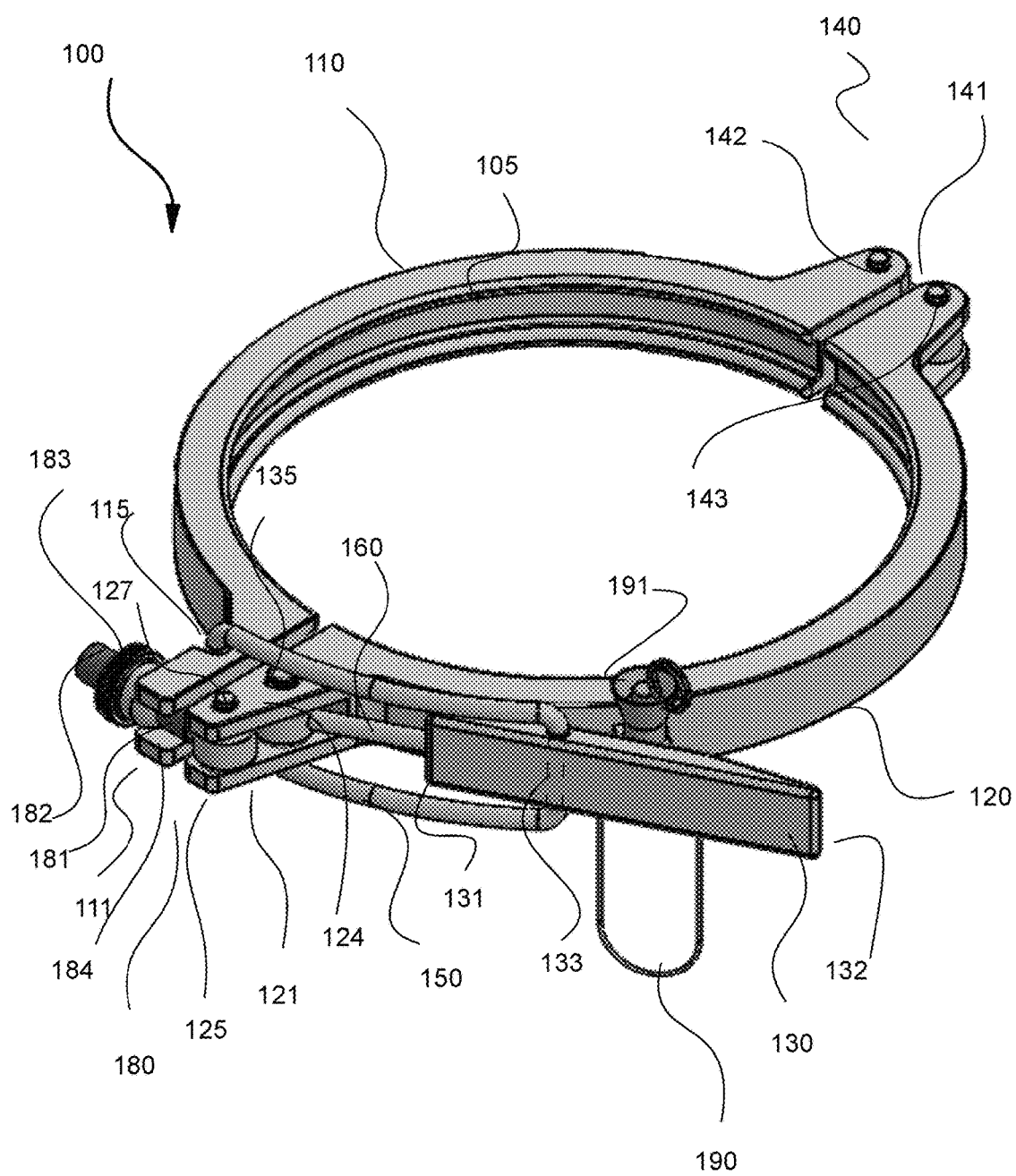
FIG. 1 is a perspective view of an embodiment of the inventive collar clamp.
Figure 2:
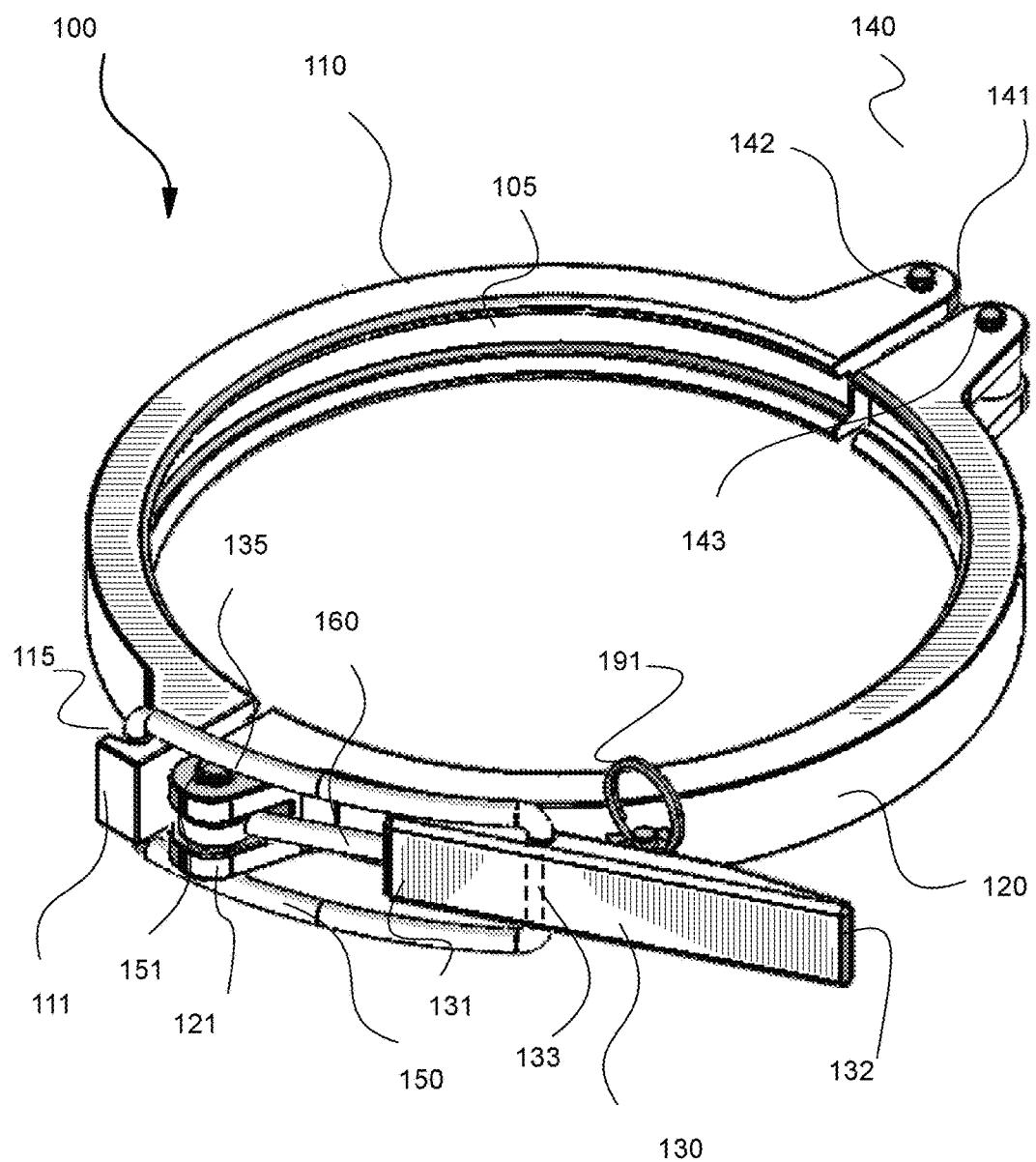
FIG. 2 is a top plan view thereof.
Figure 3:
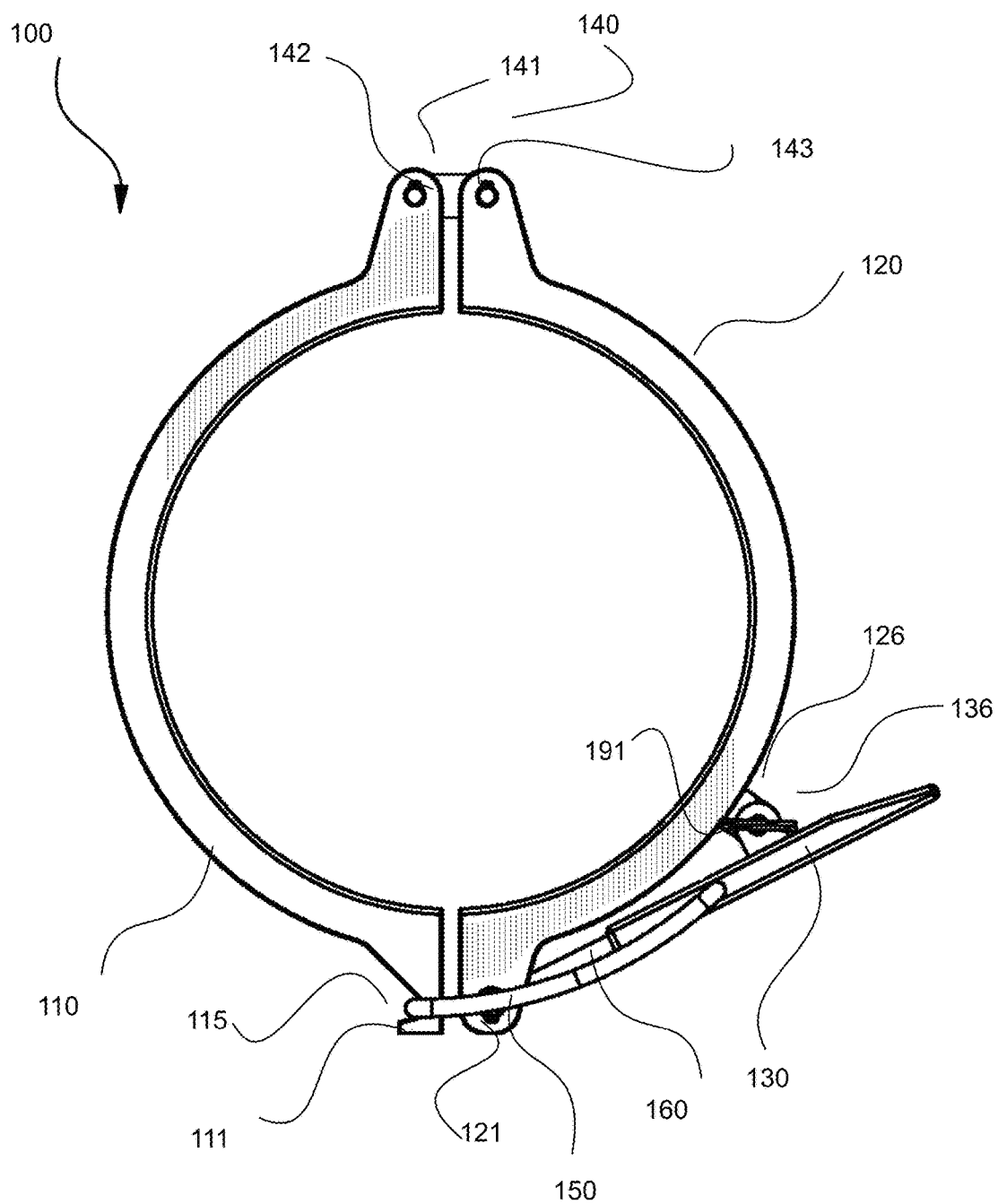
FIG. 3 is a side elevation view thereof.

Referring to FIGS. 1 through 9, wherein like reference numerals refer to like components in the various views, there is illustrated therein a new and improved Pipe Attachment Clamp, generally denominated 100 herein.

In accordance with the present invention the Pipe Attachment clamp 100 comprises a first 110 and second 120 C-shaped or semi-circular collar in hinged engagement at a distal end that is configured for clamped engagement at the proximal end via a latch lever 130, which is the primary clamping means for closing the C-shaped collars and applying a fixed clamping pressure. In the most preferred embodiment, the primary latch 130 meets the requirements of ASME section VIII, Division 1-Mandatory Appendix (M.A). The first and second C-shaped collar have an inner annular groove 105 for receiving mating pipe flanges or ferrules. The collars can have other external shapes and present the inner annular groove 105. This inner annular channel or groove 105 formed by the closed C-shaped bodies has a cross sectional shape adapted to urge the mating annular flanges of adjacent pipes or a pipe and a closure disk toward each other. Such flanges may optionally include a compliant seal member, such as a rubber gasket, or be simply closed by contact of smooth planar flange faces. The collars 110 and 120 are preferably substantial mirror images of each other, but for the attachment means at the mating proximal end, as described in the following paragraph. The annular groove shape is illustrated in greatest detail in the sectional elevation view of FIG. 9.

The hinge 140 may comprise a bar 141 in pivoting engagement with first 110 and second 120 C-shaped collars, via pins 142 and 143 at a distal end. The latch lever 130 when pivoted to a closed position urges the end of a loop shaped locking tab 150 to engage against a receiving notch 115 formed in a radial abutment at the proximal terminal member 111 of the first C-shaped collar 110. This radial abutment at the proximal terminal member 111 extends in the general outward radial direction from a geometric center of the clamp 100. Likewise, the second 120 C-shaped collar has a similarly extending outward terminal radial abutment member 121 at the proximal end. The second abutment 121 is preferably forked to accommodate a pivoting support to the latch lever 130 at its proximal end 131. The pivotal support is via rod like elongated member 160 that is in hinged connection to a first pin 151 that extends through a bore 135 in proximal terminal member or radial abutment 111. The locking tab or latch 150 preferably is in pivoting or hinged connection to the lever 130 at a bore 133 between the proximal 131 and distal end 132 thereof. When the locking tab 150 is a rigid loop of wire or rod with a circular cross-section, it need only extend through bore 133 to form the pivoting connection. When the distal end 132 of the lever 130 is urged toward the second 120 C-shaped collar, the collars 110 and 120 are drawn together by rotating at the distal end hinge 140 so that pipe flanges in the annular groove 105 will be pressed together with a predetermined clamping force. The predetermined clamping force can be modified by the shape of the groove 105 and geometric bias provided by the length of the lever arm 130. The latch 150 can have other shapes and the receiving notch 115 can be shaped to engage and securely receive the shape deployed at the distal end of the latch.

In another aspect of the most preferred embodiment, the first 110 and second 120 C-shaped collars are fabricated from an ASME Section IIA material, other than plate material that is prohibited by ASME Section VIII-Division 1, Appendix 24.

The clamp device 100 preferably includes various additional means for securing the closed position of the lever 130 from accidental displacement. Such securing means is provided to prevent the lever from being urged to the open position that would disengage the loop or locking tab 150 from the notch 115 and allow the clamp 100 to open.

One such additional securing means are overlapping eyelets 136 and 126 on the lever 130 and the collar 120 respectively that are connectedly engaged by another pin 190 or wire loop when inserted through both eyelets 136 and 126, as partly illustrated in FIG. 1, the pin 190 can terminate at an upper end with a ring 191 for grasping and removal. The pin 190 is preferably also attached with a flexible leash to the clamp device 100 so it is not lost during storage, transport or installation. More preferably, locking pin 190 is attached with a flexible lanyard or sliding leash 192 to the clamp 100, which can be optionally at the ring 191, with an opposing side or loop in the leash being attached to the lever 130.

Figure 4:
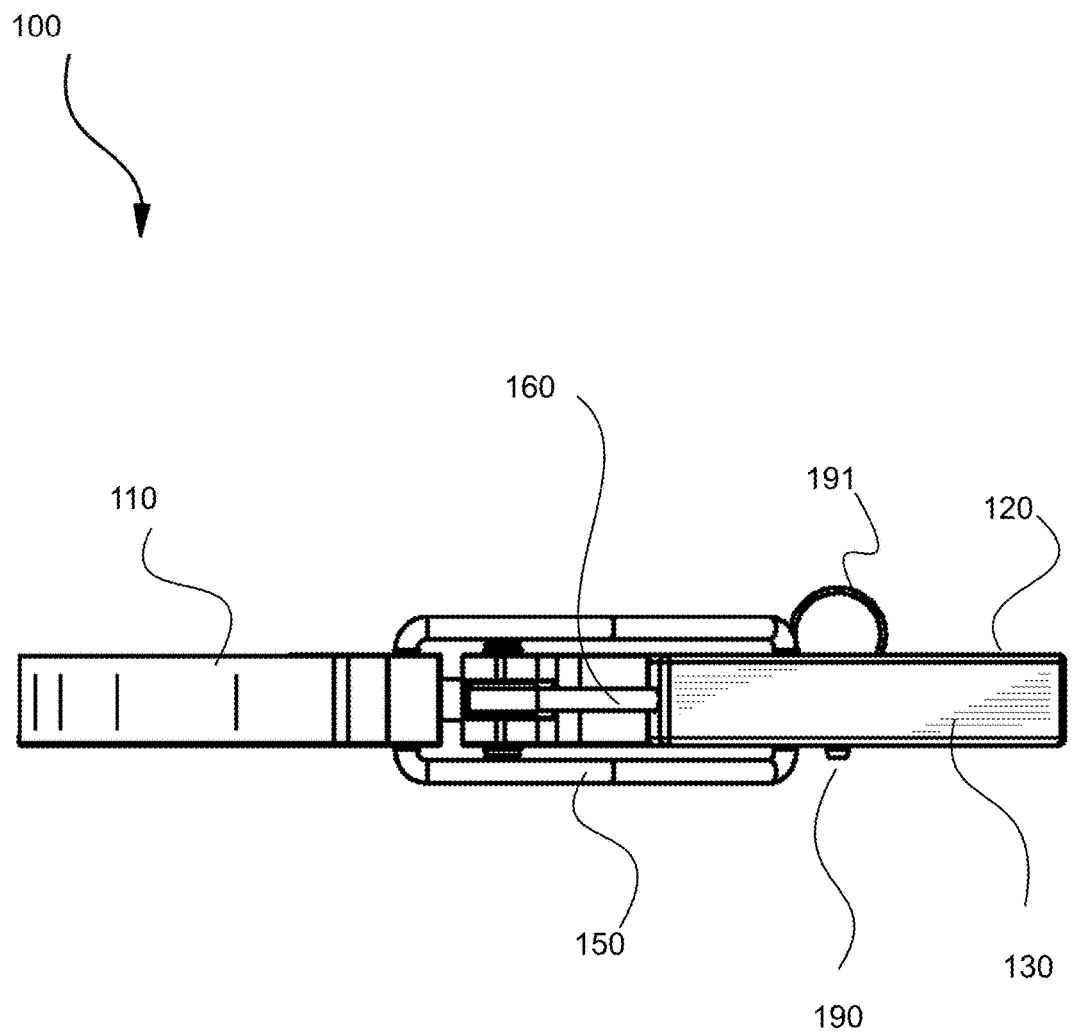
FIG. 4 is a perspective view of another embodiment of the inventive collar clamp.
Figure 5:
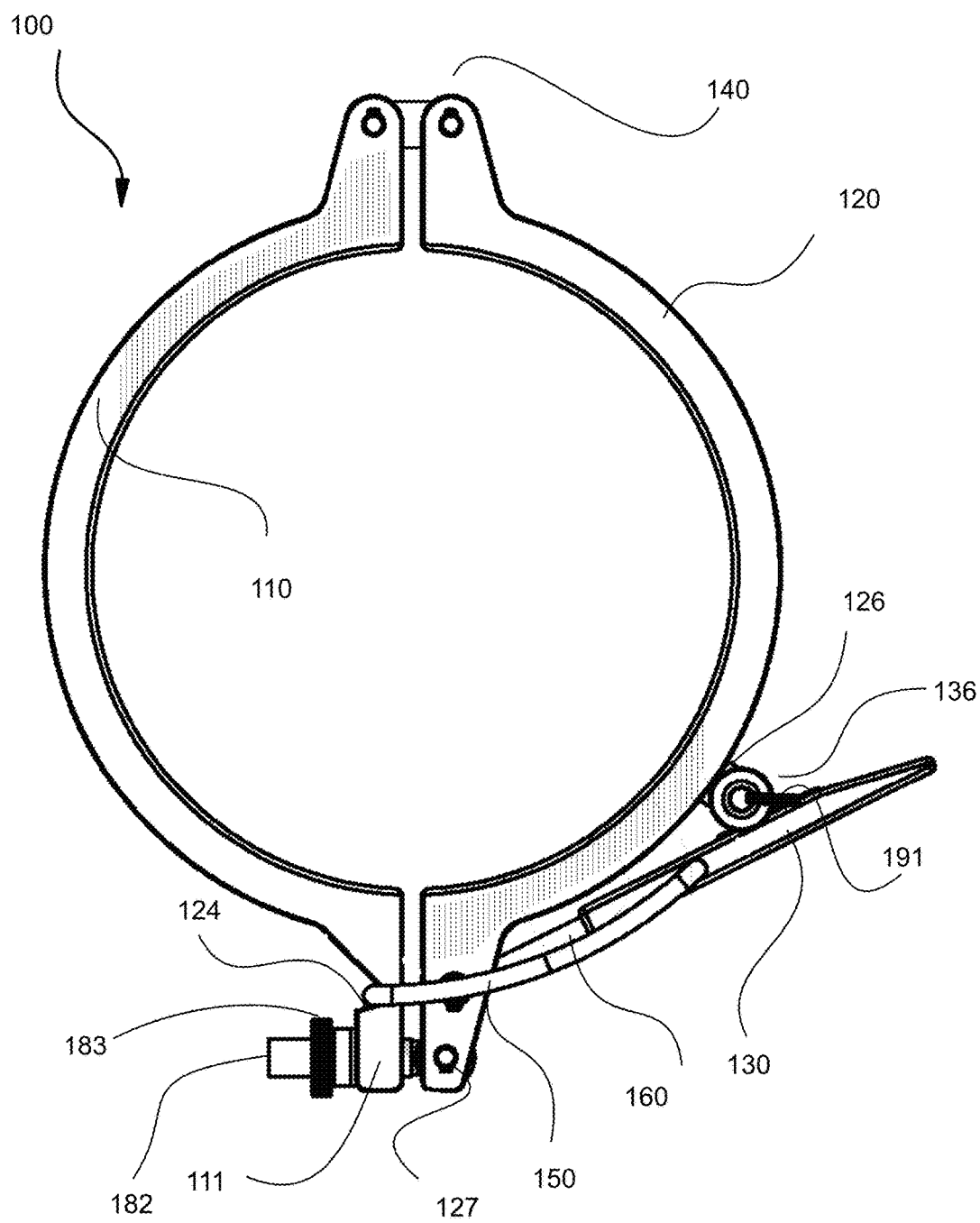
FIG. 5 is a top plan view thereof.
Figure 6:
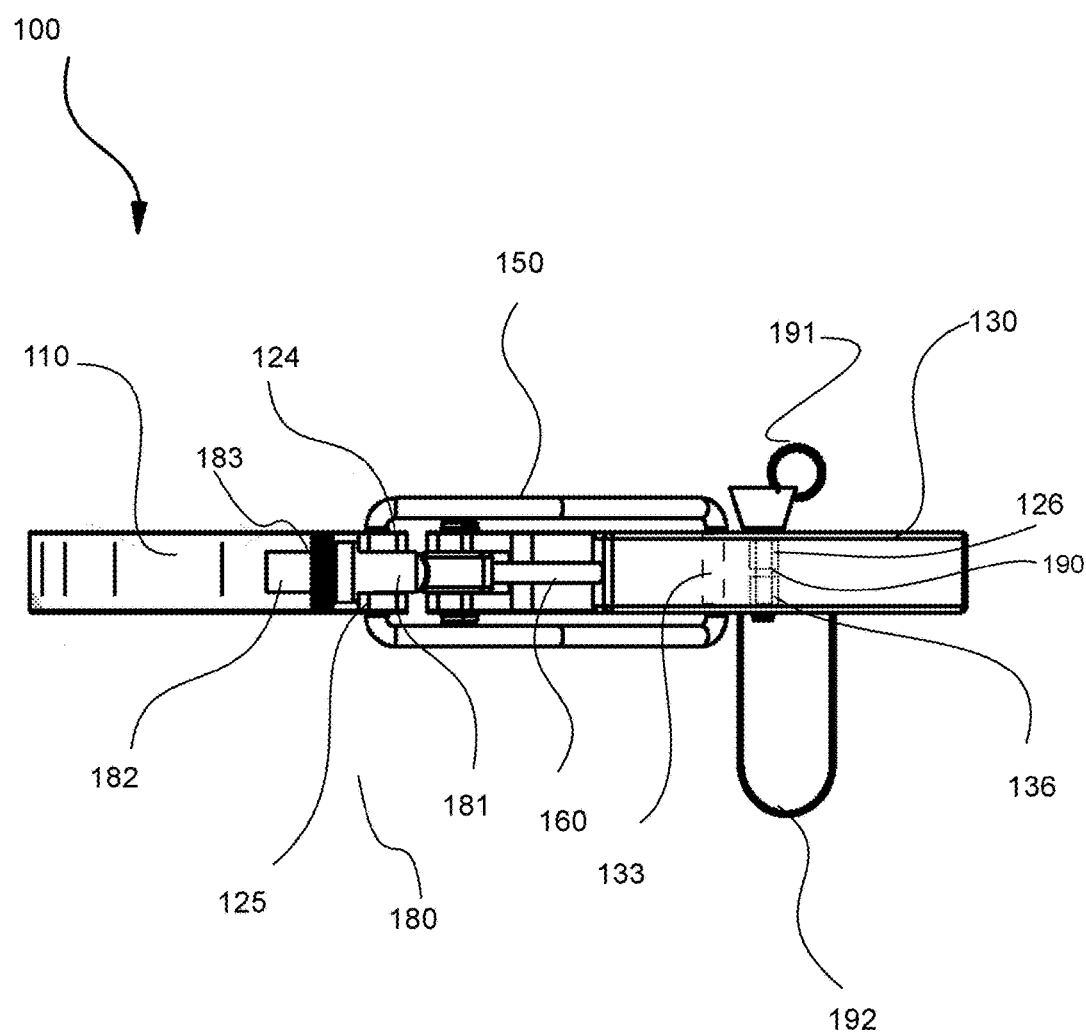
FIG. 6 is a side elevation view thereof.

The embodiment of FIG. 4-6 has an additional securing means via a direct coupling of the first and second radial abutments terminals 111 and 121 of C-shaped collars 110 and 120 respectively. This security lock 180 comprises a hinged rod, shaft or other elongated member 181 that is threaded at the distal end 182 that projects beyond the proximal terminal member 111 of the first C-shaped collar 110 via a channel formed in the distal portion of the second radial abutment 120. The opposing or proximal end of rod 181 is in hinged connection in the channel formed by the arms of the 124 and 125 of the terminal radial abutment 121 of the second C-shaped collar. The end of rod 182 preferably has a 0.5 inch diameter to comply with the bolt requirements of ASME Section VIII, D1, M.A. 24. Hence, rod 181 pivots about the axial pin 127 that extends through the proximal end of the bore 184. The axial pin 127 can be held in place between arms 124 and 125 by end flanges, and can also rotate freely within the bore formed in arms 124 and 125. A nut 183 is attached to the distal end after the clamp 100 is closed. After installing the clamp 100 the pivoting movement of rod 181 swings the distal ends 182 of rod 181 behind the proximal terminal member 111, where it would preclude the movement of the locking tab 150 when held in place by tightened nut 183. The nut 183 when placed on the distal end of rod 182, being wider than the receiving groove in the radial abutment 120 fixes the rod 181 therein, and thus provides a secondary latch or clamp means to secure the C-shaped collars 110 and 120 in the closed state, thus meeting the redundancy requirement of ASME section VIII, Division 1-M.A. 24. It should be appreciated that the hinged rod, shaft or other elongated member 181 that is threaded at the distal end 182 can be coupled in hinged engagement at the proximal end with either radial abutment 111 or 121 so the extent of the member 181 can be captured by the nut in the channel formed in the other abutment.

It will be apparent to one of ordinary skill in the art that other hinges and locks for rod 181 can be deployed, as well as a wire loop that can extend through the bore 184 and a pair of vertically overlapping bores or eyelets formed in arms 124 and 125. A wire loop deployed with either the bores in arms 124 and 125 or overlapping eyelets 136 and 126 can also be configured as a tamper evident seal. Generally, each of the means for sealing provides a secondary lock that blocks the movement of the loop 150 or the lever 130. Hence, other embodiments of the invention include blocking the movement of both the loop 150 and the lever 130 as illustrated in FIG. 4.

Figure 7:
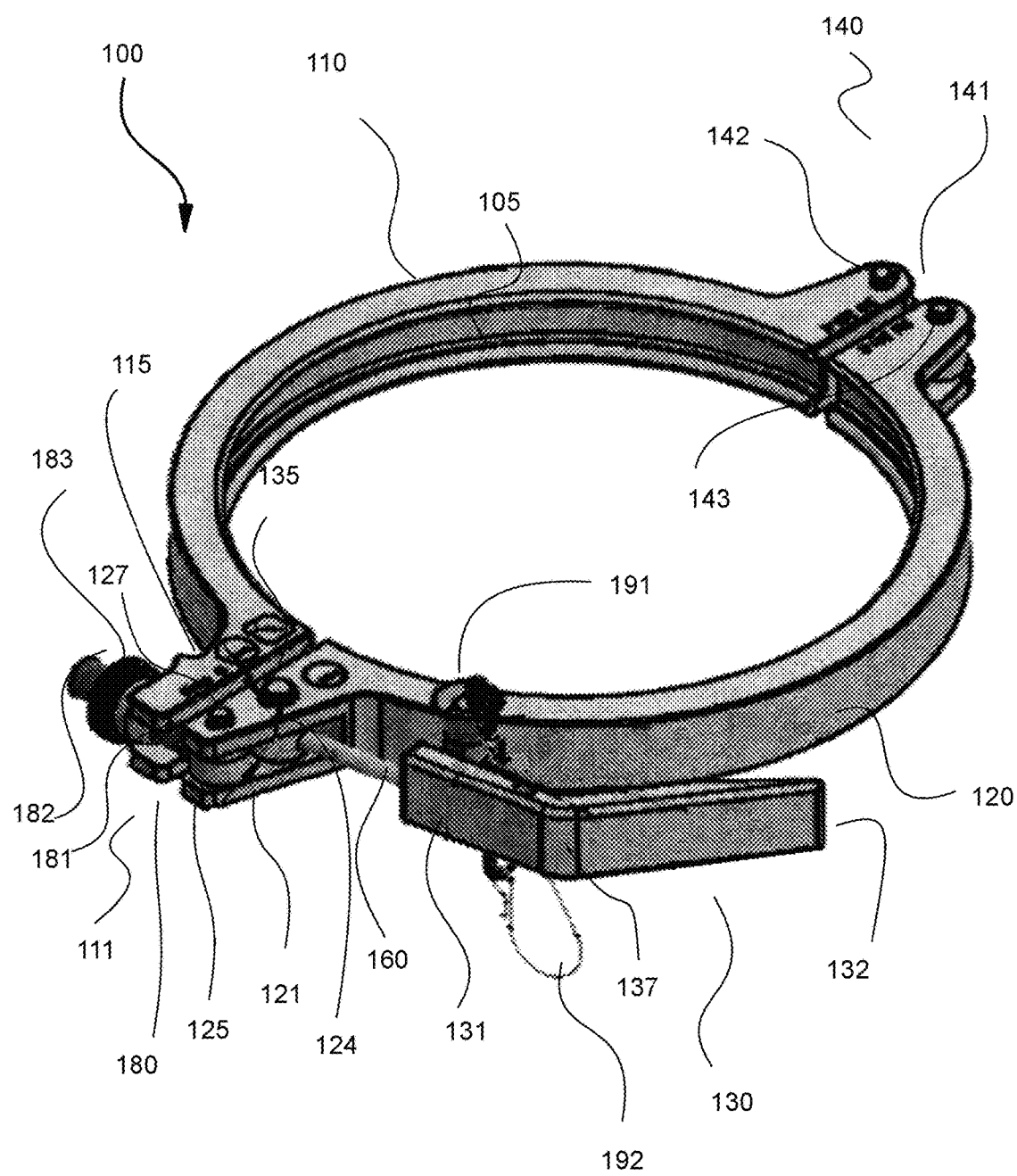
FIG. 7 is a perspective view of another embodiment of the inventive collar clamp.
Figure 8:
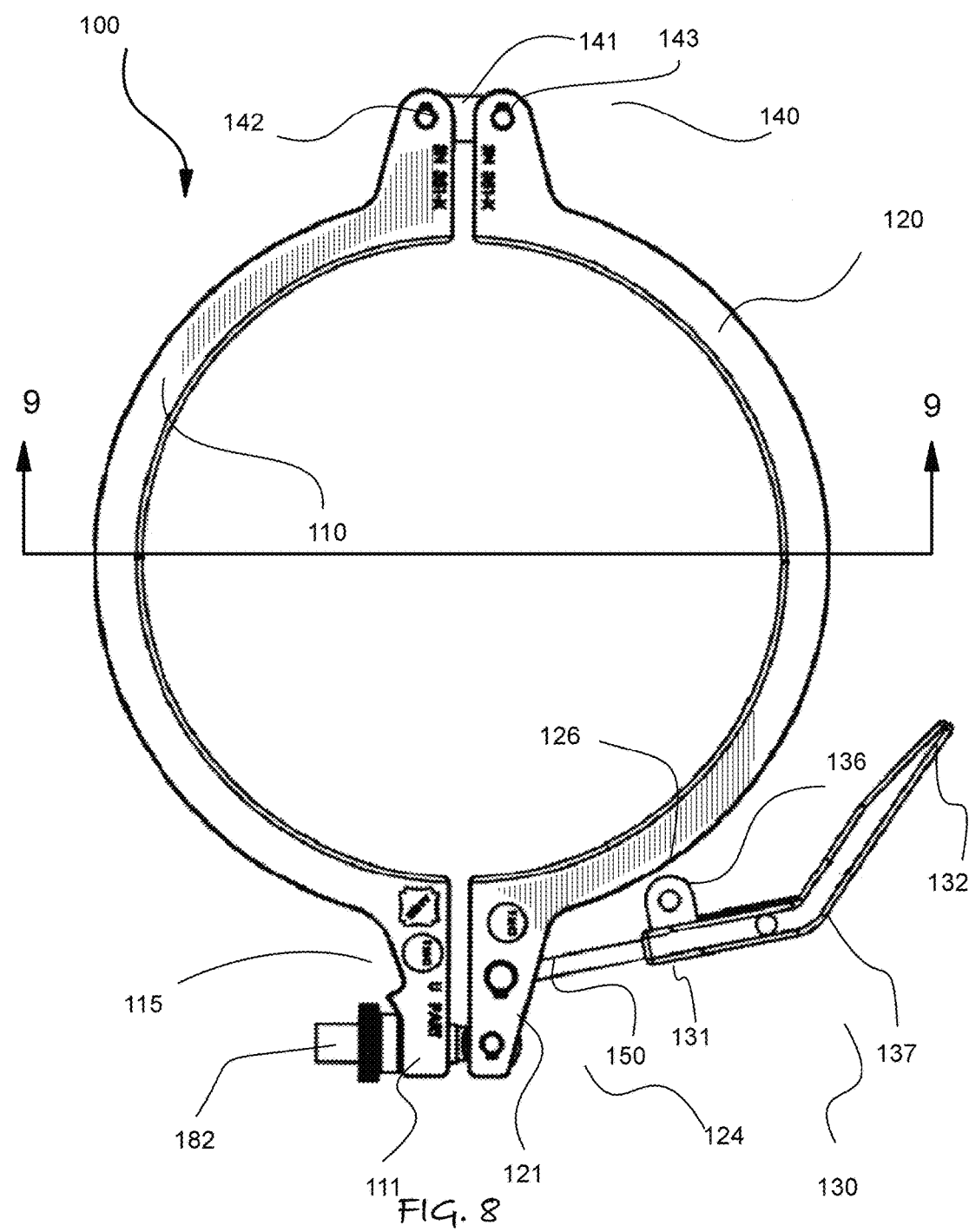
FIG. 8 is a top plan view thereof.
Figure 9:
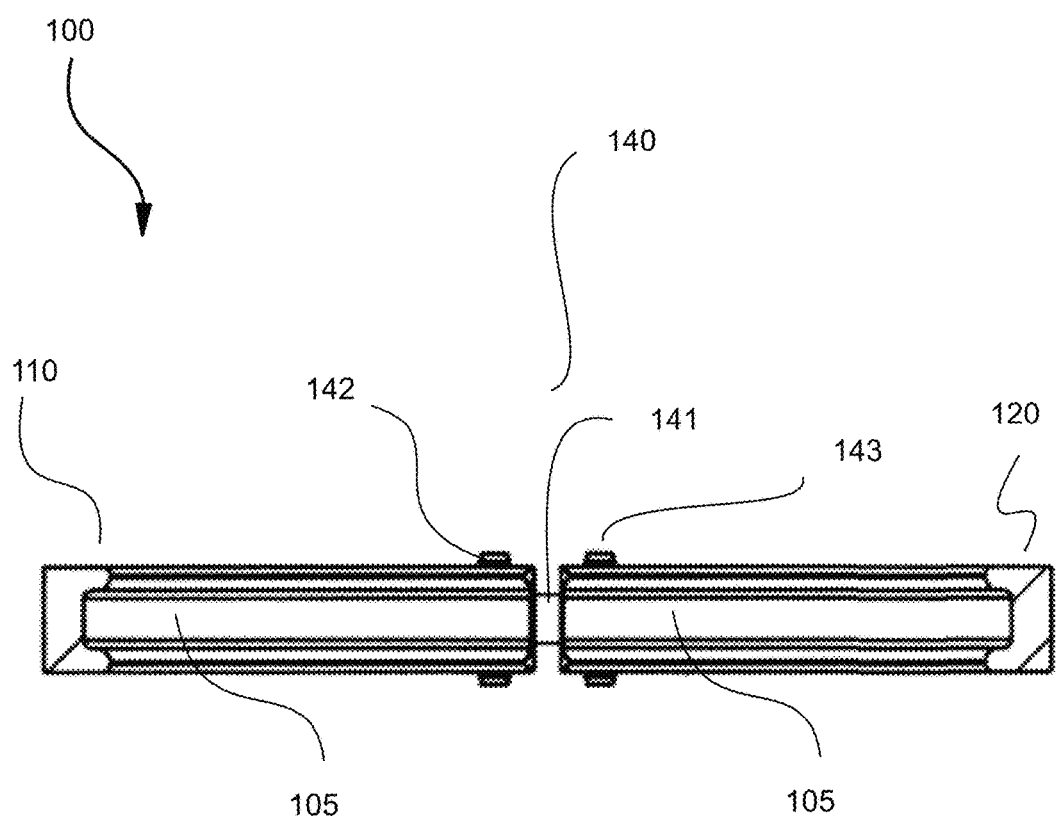
FIG. 9 is a cross-sectional elevation view thereof at section line 9-9 in FIG. 8.

The embodiment of FIG. 7-9 omits the illustration of the wire loop to better illustrate a preferred shape for a terminal radial abutment 111 of the first C-shaped collar 110. The radial abutment at the proximal terminal member 111 is widened in the tangential direction with respect to C-shaped member 110 to accommodate the notch 115. Further, the handle 130 in hinged engagement with the second radial abutment 121 is bent at the mid-section circa reference line 137 so the distal portion between 137 and distal end 132 is closer to C-ring 120 than in the other embodiments.

FIG. 8 also illustrates that as the most preferred embodiments of the inventive clamp have been approved by ASME, each clamp also bear an ASME stamp, unique ASME serial no. corresponding to a signed ASME (U2) report that is certified by the ASME representative and a representative of the manufacturer, which is at this time the applicant, signifying the materials of construction are compliant with ASME section IIA, to meet the stress values per ASME section IID. The stamp and serial no. are on the radial abutments 111 and 121.

Features, elements, methods and configurations described above with respect to one embodiment are not precluded from combinations and sub-combination with different features, elements, methods and configurations of other embodiments.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A pipe attachment clamp comprising:
    a) a pair of collars having an inner annular channel for receiving a pair of opposing flanges of pipes to be coupled,
    b) a hinge coupling at a distal end of each collar to the distal end of the other collar, in which the collars are disposed primarily in a first plane,
    c) an adjustable coupling for connecting a proximal end of each collar, the adjustable coupling being formed by:
        i) a first radial abutment from a proximal end of a first collar of the pair of collars, the first radial abutment being shaped to provide a latch receiving means,
        ii) a second radial abutment from a proximal end of a second collar of the pair of the collars including:
            (1) a hinge,
            (2) an armature having a proximal end and an opposing distal end and that is connected to the hinge at the proximal end to rotate in the first plane via the hinge,
        iii) a lever connected at a proximal end to a distal end of the armature and having a distal end opposing the proximal end,
        iv) a latch having a proximal end for extending over the first radial abutment and engaging the latch receiving means, wherein the latch is connected in rotary engagement to the lever to secure the first and second radial abutments in a closed position when the distal end of the lever is pivoted toward the second collar to a latched position to secure each collar to the other at the proximal ends thereof,
    wherein each of the first and second radial abutments has a distal end opposite a connection with the first and second collar, in which the adjustable coupling further comprises an elongated member coupled to pivot about the distal end of one radial abutment so that a central portion of the elongated member extends into a channel in the distal end of the other radial abutment and the elongated member is adapted to be clamped in the channel in which the elongated member is coupled proximal to the distal end of the other radial abutment.

2. The pipe attachment clamp of claim 1 further comprising a pair of eyelets capable of overlapping in which a first eyelet is disposed on the second collar having the second radial abutment and a second eyelet is disposed on the lever to overlap with the first eyelet for receiving a locking pin for securing the latched position of the lever.

3. The pipe attachment clamp of claim 2 further comprising a locking pin for insertion in the overlapping first eyelet and second eyelet.

4. The pipe attachment clamp of claim 3 wherein the locking pin is attached with a flexible leash to the clamp.

5. The pipe attachment clamp of claim 3 wherein the locking pin is coupled to a ring for grasping and removal.

6. The pipe attachment clamp of claim 5 wherein the locking pin is attached with a flexible leash to the clamp at the ring.

7. The pipe attachment clamp of claim 1 wherein the elongated member is a rod having a threaded portion for attaching a nut in which the threaded portion extends past one of the radial abutments.

8. The pipe attachment clamp of claim 7 wherein the latch is a rigid wire loop.

9. The pipe attachment clamp of claim 8 wherein the rigid wire loop is capable of extending over the elongated member when the distal end of the lever is pivoted toward the second collar to the latched position to secure each collar to the other at the proximal ends thereof.

10. The pipe attachment clamp of claim 9 further comprising a nut attached to the threaded portion that extends past one of the radial abutments.

11. The pipe attachment clamp of claim 10 wherein the nut prevents the rigid wire loop from pivoting to extend over the first and second radial abutments to preclude opening the latch.

12. The pipe attachment clamp of claim 1 wherein at least one of the collars is substantially a semi-circular body.

13. The pipe attachment clamp of claim 1 wherein a portion of each collar between the distal end and the radial abutment of each collar is substantially the mirror image of the other collar.

14. The pipe attachment clamp of claim 1 wherein the latch is a rigid wire loop.

15. The pipe attachment clamp of claim 1 wherein the hinge comprises a bar having opposing ends, each opposing end in pivoting engagement with the distal end of each of the first and second collars.

16. The pipe attachment clamp of claim 1 wherein the elongated member is adapted to be clamped in the channel by a threaded nut in a distal end of the elongated member.

17. A pipe attachment clamp comprising:
   a) a pair of collars having an inner annular channel for receiving a pair of opposing flanges of pipes to be coupled,
   b) a hinge coupling at a distal end of each collar to the distal end of the other collar, in which the collars are disposed primarily in a first plane,
   c) an adjustable coupling for connecting a proximal end of each collar, the adjustable coupling being formed by:
      i) a first radial abutment from a proximal end of a first collar of the pair of collars, the first radial abutment being shaped to provide a latch receiving means,
      ii) a second radial abutment from a proximal end of a second collar of the pair of the collars including:
         (1) a hinge,
         (2) an armature having a proximal end and an opposing distal end and that is connected to the hinge at the proximal end to rotate in the first plane via the hinge, in which each of the first and second radial abutments has a distal end opposing a connection at a proximal end to the proximal end of the first and second collar,
      iii) a lever connected at a proximal end to a distal end of the armature and having a distal end opposing the proximal end,
      iv) a latch having a proximal end for extending over the first radial abutment and engaging the latch receiving means, wherein the latch is connected in rotary engagement to the lever to secure the first and second radial abutments in a closed position when the distal end of the lever is pivoted toward the second collar to a latched position to secure each collar to the other at the proximal ends thereof,
      v) a rod having a proximal end in hinged connection to the second radial abutment and a distal end opposing the proximal end that is threaded to receive a nut, the first radial abutment being configured to have a channel in a distal end so that a portion of the rod between the distal and proximal ends can be positioned in the channel when the clamp is closed with the threaded distal end extending past the first radial abutment,
      vi) in which the latch receiving means is disposed between the first collar and the channel in the first radial abutment such that the nut can extend beyond the proximal end of the latch to preclude the opening of the latch.

18. The pipe attachment clamp of claim 17 further comprising a pair of eyelets capable of overlapping in which a first eyelet is disposed on the second collar having the second radial abutment and a second eyelet is disposed on the lever to overlap with the first eyelet for receiving a locking pin for securing the latched position of the lever.

19. The pipe attachment clamp of claim 17 wherein the latch is a rigid wire loop.

* * * * *